United States Patent [19]

Fredholm

[11] Patent Number: 5,683,482

[45] Date of Patent: Nov. 4, 1997

[54] DEVICE AND METHOD FOR SHAPING RODS, ESPECIALLY OF GLASSY MATERIAL

[75] Inventor: Allan Mark Fredholm, Mennecy, France

[73] Assignee: Corning Incorporated, Corning, N.Y.

[21] Appl. No.: 630,322

[22] Filed: Apr. 10, 1996

Related U.S. Application Data

[60] Provisional application No. 60/004,516 Sep. 29, 1995.

[30] Foreign Application Priority Data

Apr. 19, 1995 [FR] France .................. 95 04647

[51] Int. Cl.⁶ .................................................. C03B 40/04
[52] U.S. Cl. ...................... 65/25.1; 65/84; 65/85; 65/182.2; 65/325; 65/326
[58] Field of Search .................. 65/25.1, 84, 85, 65/105, 126, 182.2, 187, 325, 326

[56] References Cited

U.S. PATENT DOCUMENTS

| | | | |
|---|---|---|---|
| 2,992,517 | 7/1961 | Hicks | 65/401 |
| 3,190,739 | 6/1965 | Wilson | 65/85 |
| 3,298,808 | 1/1967 | Macks | 65/25 |
| 3,822,120 | 7/1974 | Koizumi et al. | 65/400 |
| 4,351,658 | 9/1982 | Olshansky | 65/430 |
| 4,620,861 | 11/1986 | Berkey | 65/399 |
| 4,875,917 | 10/1989 | Lentz | 65/403 |
| 4,883,522 | 11/1989 | Hagerty et al. | 65/17.6 |
| 4,929,065 | 5/1990 | Hagerty et al. | 350/413 |
| 5,069,700 | 12/1991 | Yamane et al. | 65/17.2 |
| 5,106,400 | 4/1992 | Tick | 65/388 |
| 5,350,433 | 9/1994 | Baniel | 65/388 |

FOREIGN PATENT DOCUMENTS

| | | |
|---|---|---|
| 0560638 | 9/1993 | European Pat. Off. . |
| 2649392 | 1/1991 | France . |
| 2504515 | 10/1992 | France . |

*Primary Examiner*—Donald E. Czaja
*Assistant Examiner*—Sean Vincent
*Attorney, Agent, or Firm*—Angela N. Nwaneri

[57] ABSTRACT

A device for shaping rods, in particular, of a glassy material, by casting said material in a molten state in a mold, characterized by the fact that said mold comprises a) a cylindrical internal wall of a porous material and b) a means to inject a gas in this wall and cause it to come out of the wall on the side facing the glassy material accumulated in the mold, so as to constitute an interstitial flow of a film of gas that separates the glassy material from the inside wall of the mold.

17 Claims, 2 Drawing Sheets

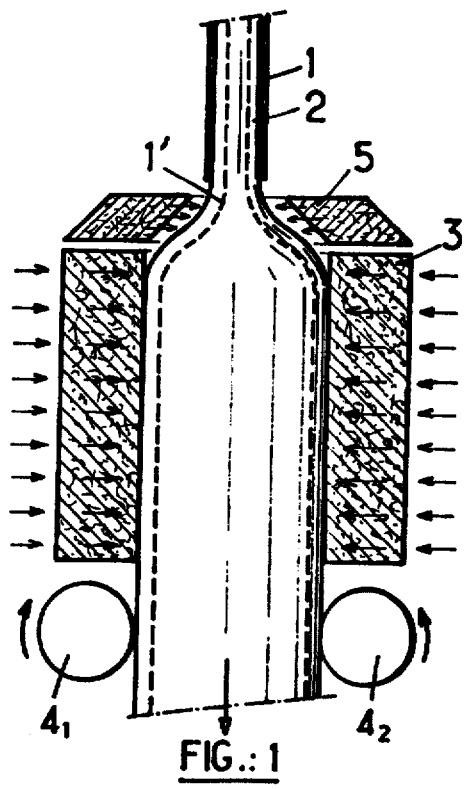
FIG.:1
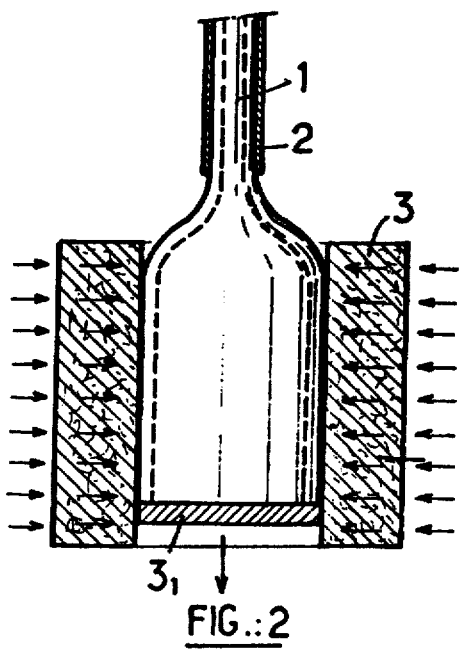
FIG.:2
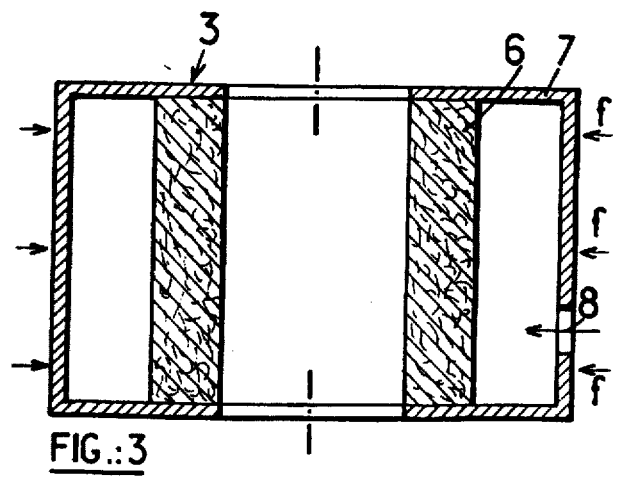
FIG.:3
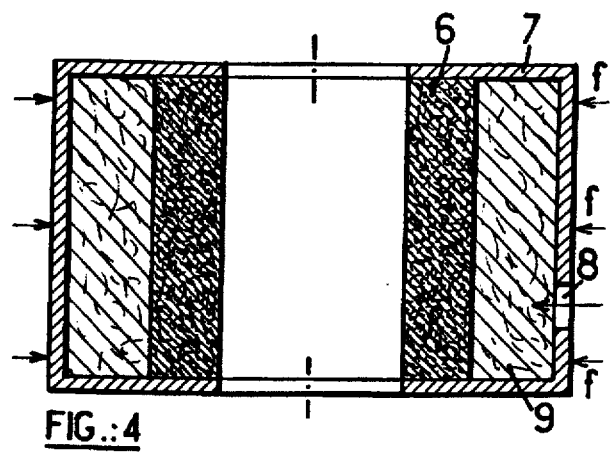
FIG.:4
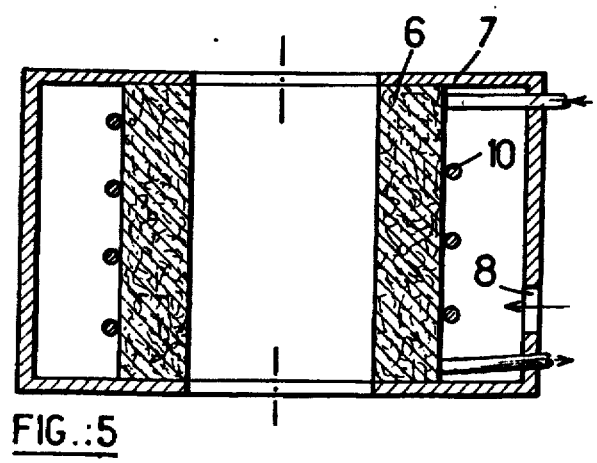
FIG.:5

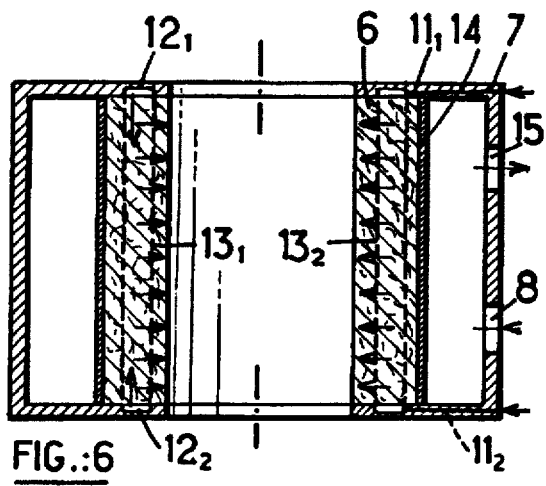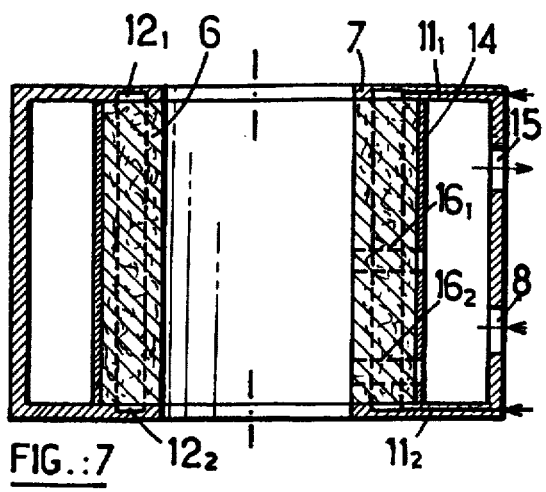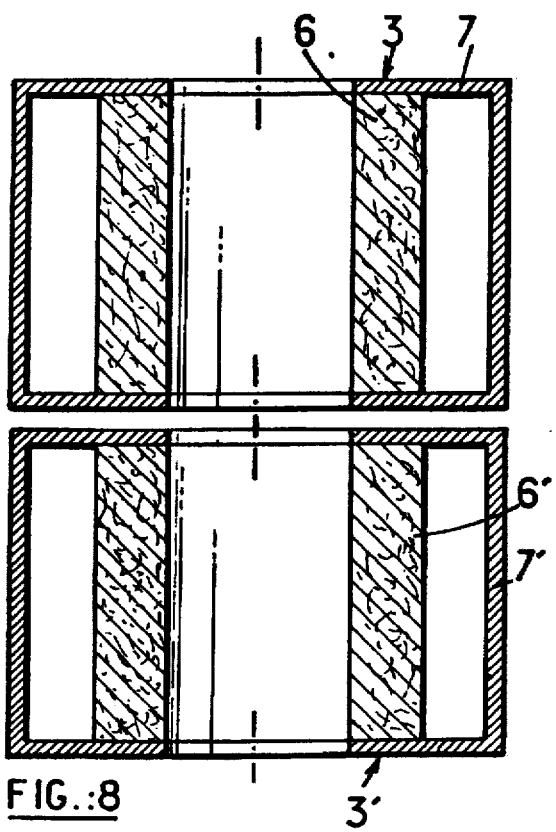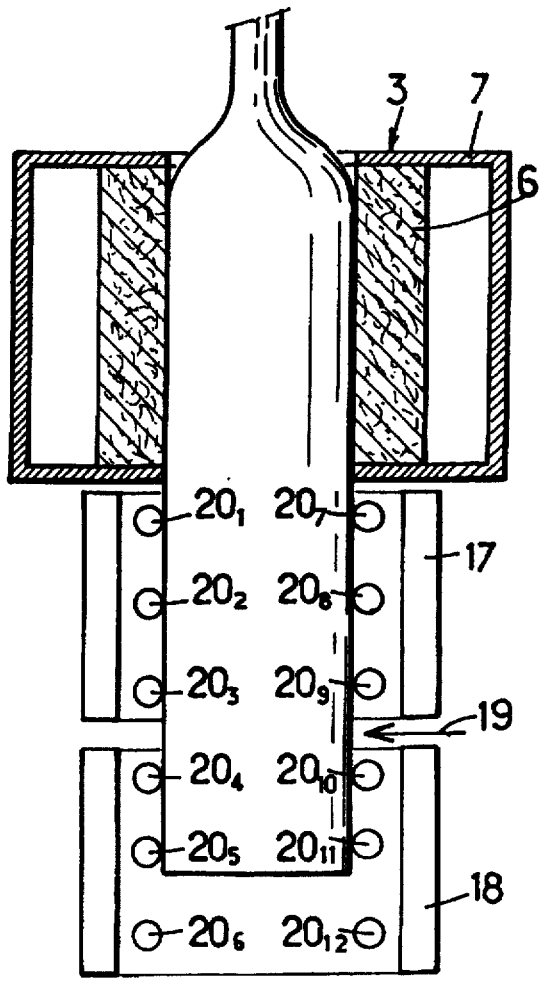

DEVICE AND METHOD FOR SHAPING RODS, ESPECIALLY OF GLASSY MATERIAL

FIELD OF THE INVENTION

This application claims the benefit of U.S. Provisional application Ser. No. 60/004,516, filed Sep. 29, 1995, entitled "Device For Shaping Rods, Especially of a Glassy Material", by Allan Fredholm.

BACKGROUND OF THE INVENTION

The present invention pertains to a device for shaping rods of a glassy material and, more particularly, to such a device operating by casting said material, in particular, glass in a molten state in a mold.

To make optical components, such as lenses, for example, the process may be started by forming blanks from a glass rod cut into sections, with each blank then being ground or remelted and cast, to attain the final shape of the lens.

Another way of making optical components, known as "ramming," consists of reheating the end of a rod in a furnace until the glass at the end of this rod is softened and then inserting said end into a press, of which, the internal shapes of the molds are essentially those of the component being made. Obtaining a component with a good quality surface requires a rod with a good surface quality, generally referred to as "fire polished."

Other ways of making glass rods may be used for cylindrical waveguides and blanks for the manufacture of optical fibers by drawing, in which a good rod surface condition is also necessary.

In order to shape a glass rod, the so-called "vello" or "downdraw" procedures are known, according to which the molten glass is cast from the bottom of a vessel with an opening made in it in which is installed a bell on the surface of which the molten glass flows by gravity, before coming together under the bell. A glass tube can be formed below the bell by injecting air into the glass along the axis of the bell. A glass cord is formed by pumping the air out along this axis to help gather the fibers of molten glass under the bell. The glass cord or rod thus formed can then be drawn and thermally conditioned until it hardens.

These procedures make it possible to obtain a rod with a good surface condition inasmuch as it remains free of all contact during the formation of the rod, while the glass is still in a plastic state. The flow rates of the material may be high (on the order of 50–300 kg/h). On the other hand, the glass must have an adequately high level of viscosity (50,000 to 100,000 P) around the bell to counter the force of gravity acting on the formed glass rod, which may not exceed a relatively small diameter (approximately 30–50 mm at most). One example of this method is described in U.S. Pat. No. 3,298,808.

This means then that types of glass that devitrify at a low viscosity cannot be used. Furthermore, the quality of the glass rods obtained is insufficient for optical applications because of the inhomogeneity of the glass in the vicinity of the axis of the rod. Other disadvantages limit these procedures, in particular, the tendency of the rod have an oval section, difficulty in setup, and impossibility of producing rods with a cross-sectional composition gradient, while such a gradient is commonly used today, particularly in optical lenses with a radial refractive index gradient.

A procedure is also known for obtaining a glass rod by continuous casting of molten glass in an inclined mold, which is usually cooled. After the mold, before reaching the cutting area, a means for thermal conditioning and a means for regulating the speed of the rod exiting the mold are found. This procedure makes it possible to produce rods with different sections (circular, oval, rectangular, etc.) by an appropriate shaping of the section of the mold. The devitrification of the glass poses less problems than in the processes described above; the glass obtained may be of optical quality and rods with large diameters may be made for obtaining thick optical lenses, for example.

On the other hand, because of the contact between the glass casting and the walls of the mold, the surface quality of the rod obtained is poor, since this surface is marked by undulations called "chill wrinkles," which must be removed by machining, which increases the cost of manufacturing and causes a loss of material.

Still another procedure for forming glass rods includes casting molten glass in a split mold, which is equipped with a moving bottom that descends inside the mold during the casting. After an adequate cooling period, the mold is opened to remove the glass rod contained in it. There is contact between the glass and the mold, and so there is the possibility of "chill wrinkle" defects on the surface, as in the procedure that operates by casting in an inclined mold. Examples of various methods of forming tubes and rods are also described in U.S. Pat. Nos. 2,992,517; 3,190,739; 3,822,120; 4,351,658; 4,875,917; 5,106,400 and 5,350,433.

The purpose of the present invention is, therefore, to make a device for shaping a rod of a glass material that does not present any of the defects of the devices implementing the procedures described above.

SUMMARY OF THE INVENTION

In particular, the purpose of the present invention is to make a device for shaping rods of a glassy material with an excellent "fire polished" type of surface without chill wrinkles with this device making it possible to simultaneously obtain rods with a large diameter (greater than 100 mm), ensure that the rod is given a cross-sectional profile of a composition established in the casting of the molten material that feeds it, without disturbing said profile, render the making of optical-quality glass rods possible, even with types of glass that easily devitrify, and obtain rods with a straight section of different shapes, with a device that can be adapted over an extensive range of flow rates of glass and offer a very short setup time.

The goals of the invention are attained, as well as others that will appear in the following description, with a device for shaping a rod of a glassy material, by casting the material in a molten state. The device includes:

(a) a mold having a vertical axis and a fixed cross-section, the mold comprising
  i) a cylindrical internal wall of a porous material, and
  ii) means connected to the wall for injecting a gas into the wall to cause the gas to come out of the wall on the side facing the glassy material accumulated in the mold, so as to constitute an interstitial flow of a film of gas that separates the glassy material from the inside wall of the mold;

(b) a casting tube centered above the vertical axis of the mold, for feeding the glassy material into the mold; and (c) a zone separating the casting tube from the mold.

As a result of to the very thin "cushion" of gas thus formed between the glassy material and the mold, the shape of the rod obtained remains considerably close to that of the mold and remains, however, free of any physical contact with it, which allows its surface to retain a perfect finish, without any "chill wrinkles."

According to another characteristic of the device according to the invention, it may comprise a means for thermal conditioning of the glassy material and the mold.

According to still another characteristic of the device according to the invention, the mold may comprise an enclosure of which one of the walls consists of a porous wall, and a means to inject a gas under pressure into this enclosure. This may be partially filled with a porous material that enables a transfer of heat between the porous wall of the mold and the enclosure. This porous wall may be isolated from the enclosure by a gas-tight coating, with a means for injecting gas into this wall connected to the surfaces of the wall not covered by this coating and with a cooling fluid circulating in the enclosure.

BRIEF DESCRIPTION OF THE DRAWINGS

FIG. 1 is a cross-sectional diagram of the present device showing the glassy material being delivered through a casting tube;

FIG. 2 is a cross-section of a prior art device having a mold with a moving bottom;

FIG. 3 is a diagram showing the porous walls of the mold inserted into a gas-tight enclosure having an inlet for gas;

FIG. 4 shows a variation of the mold of FIG. 3 in which the space between the enclosure and the porous wall of the mold contains a macroscopically porous material;

FIG. 5 is another variation of the mold of FIG. 3 further containing a spiral tubular element for conditioning the inside porous wall;

FIG. 6 is a variation of the inventive device in which the gas does not enter through the outside surface of the porous wall, but rather through several vertical holes;

FIG. 7 is a variation of the device of FIG. 6 in which the porous wall further contains horizontal holes which pass through the gas-tight outside coating;

FIG. 8 is a variation of the inventive device in which two molds are arranged one on top of the other; and FIG. 9 is a diagram showing an inventive device in which a thermal conditioning means are installed at the outlet of the mold to homogenize the temperature of the glass.

DETAILED DESCRIPTION OF THE INVENTION

Other characteristics and advantages of the device according to the invention will appear in the following description and the attached drawings in which FIGS. 1-9 represent different ways of realizing the device according to the invention.

Reference is made to the device represented in FIG. 1 in which a glassy material 1 in a molten or doughy state appears, such as glass, delivered through a casting tube 2, fed by a reservoir of doughy glass (not shown). A fixed cylindrical mold 3, with a vertical axis, the cross-section of which is greater than or equal to that of the casting tube, is placed below the end of the tube. The casting tube and the mold are separated by a zone such that glassy material passing from the casting tube into the mold, passes through this zone. This zone, which we refer to as a "free fall zone," separates the tube and the mold and results in several significant advantages. For example, as a result of this zone, the tube and the mold are thermally independent of each other. This thermal independence eliminates the need to keep the bottom of the tube (i.e., the portion of the tube closest to the mold) sufficiently hot so that the glassy material remains liquid without divitrifying. At the same time, the temperature of the upper region of the mold (i.e., the portion closest to the tube), is kept at a lower temperature. Another advantage of the zone separating the mold from the tube is that it becomes relatively easy to disassemble or change any part of the device without much difficulty. More importantly, in systems in which the tube and is in sealed contact with the mold, there is a risk that glassy material may infiltrate into the assembly and solidify therein, making it difficult to achieve proper assembly of the device. Such risk is avoided in the present invention by making the two units separate and independent of the other.

According to the invention, the mold 3 is made of a porous material. The outside of the mold 3 is fed with a gas under pressure that penetrates the mold according to the flow lines shown by the arrows and enters the inside of the mold.

The bottom of the mold is open. The glass rod, which is formed in the mold and hardened by cooling, continuously flows out of it. Guiding rollers $4_1$, $4_2$, located at the exit of the mold, gripping the rod, draw it and adjust the speed of the glass flowing into the mold so that the area in which the glass spreads is formed in the vicinity of the upper surface of the mold 3. The glass is, therefore, made to closely follow the internal profile of the mold 3, without direct contact with the latter, due to the interstitial "film" gas established between the glass and the mold by the gas blown through the wall of the mold.

It will also be noted that the device according to the invention makes it possible to make glass rods with a large diameter by increasing the flow of glass exiting the tube 2, with a smaller diameter, with this flow of a small diameter making it possible to avoid problems of devitrification that are sometimes found with flows with a large diameter. In effect, with the same flow rate, a tube with a smaller diameter makes it possible to deliver glass with a lower viscosity.

In the course of its path to the bottom of the mold, the glass cools to the point of being able to be manipulated without damage and to support its own weight. It may then travel into a thermal conditioning area and into a cutting device (not shown).

The manner in which the device according to the invention shown in FIG. 2 is realized provides a discontinuous production of glass rods. It is distinguished from the manner shown in FIG. 1 in that it comprises a mold 3 equipped with a moving bottom $3_1$, fitted on a jack (not shown), for example, to ensure the progressive descent of the glass in the mold and its rise for discharging from the mold. This variation is particularly more suitable for heavy flow rates of glass. Actually, it makes it possible to design a device containing several molds fitted on a rotating turret, for example, and installed successively under the casting tube 2.

As noted above, the defect to be overcome is the "chill wrinkles" (annular undulations on the external surface of the glass). This defect is created when the skin of the glass is cooled preferentially with regard to the core of the glass, in the spreading area located at the top of the mold according to the invention. The formation of a film of gas that separates the glass from the mold is the preponderant factor that leads to the reduction or elimination of this phenomenon. The other factors that make it possible to limit this phenomenon include: a limitation of the ratio of the spreading of the casting to the entry into the mold, a low viscosity of the glass, a high flow rate of the glass, a high part of the hot mold, and a high-temperature environment in the area separating the bottom of the tube from the top of the mold.

To establish such an environment, a heating means 5 may be located at this level, consisting of burners or electrical resistors (see FIG. 1). These means may also be integrated into the upper part of the mold.

One of the advantages of the device according to the invention lies in the fact that it makes it possible to transfer, homothetically, a profile of an axisymmetrical composition, established in the casting of molten glass entering the mold. Such a composition profile may be, by way of example, that of a succession of concentric layers of different types of glass, or a material obtained after the initial formation of such a succession of layers then partial interdiffusion of these layers on the interfaces such as that (1') represented by a dashed line in FIG. 1. Means are described that make it possible to obtain such a profile in concurrently filed, co-assigned, co-pending U.S. application Ser. No. 08/630,652, which claims benefit of U.S. Provisional application Ser. No. 60/004,515, filed Sep. 29, 1995, entitled "Method and Device for Manufacturing a Rod of a Material Having a Cross-Sectional Composition Gradient," incorporated herein by reference.

Differences in density and/or viscosity between the different layers of glass are liable to disturb the transfer of the profile. These disturbances may be thwarted by the establishment of a high average viscosity (>50 P) in the glass and by the establishment of a mold temperature profile that provides quick cooling of the glass after spreading.

In certain cases, the flow rate of the glass supplied is low, the viscosity high and the tube 2 of a small diameter (for example, 5 kg/h, 5000 P, and a tube with a diameter of 10 mm) and a high spreading ratio is desired, 10, for example. Particular care should then be given to the matter of heat in the spreading area, a high temperature must be established in the top area of the mold, and heating means 5 may be added (see FIG. 1) to maintain a high-temperature environment between the bottom of the tube 2 and the top of the mold 3.

By way of example, graphite, porous structures of stainless steel, a nickel alloy or bronze, or porous ceramics may be suitable for constituting the porous wall of the mold, provided it shows a good surface condition. The relative gas pressures are, for graphite, 13% porosity with a wall thickness of 8 mm, 0.5–6 bar. The values to be used for other materials are inferred from their permeability and the wall thickness used.

FIGS. 3–7 show, in a diagram of an axial cross section, different ways of making the mold, which is part of the device according to the invention, by way of illustrative, nonlimiting examples. In these figures, identical references numerals designate identical or similar elements or components.

In the mold in FIG. 3, the porous wall 6 of the mold is inserted into a gas-tight enclosure 7, equipped with an inlet 8 for the glass, which should flow out in a film, between the inside surface of the wall 6 and the glass contained in the mold. Cooling of the outside surface of the enclosure (for example, with air or water flowing according to arrows f) may be used. The cooling capacity of such a mold is, however, weak. It is suitable for very low flow rates or for the lower part of a device operating with a heavier flow rate, as will be explained below with reference to FIG. 8.

FIG. 4 shows a variation of the mold of FIG. 3, in which the space located between the enclosure and the porous wall 6 of the mold is occupied by a macroscopically porous material 9, for example, metal particles (beads, pins, braids of metal wool, etc.) that provide a transfer of heat between the wall 6 and the enclosure 7. Cooling or heating applied to the enclosure 7 (according to arrows f) is thus transferred to the porous wall 6 of the mold.

The mold of FIG. 5 is derived from that of FIG. 3 with the addition of a spiral tubular element 10 consisting of another means of thermally conditioning the inside porous wall 6 of the mold, with which it is in contact. This element may consist of a tube for circulating a cooling fluid, or of an electrical heating resistor. Two of such elements may be stacked, one at the top of the mold to heat it as seen above, another in the remainder of the mold, to cool it down.

In the mold of FIG. 6, the gas does not enter through outside surface of the porous wall 6 of the mold, but through several vertical holes made through it. Passages $11_1$, $11_2$, made in the wall of the enclosure 7 and annular grooves $12_1$, $12_2$ enable the gas to enter these vertical holes $13_1$, $13_2$, etc., which are distributed in a ring. The outside surface of the porous wall 6 of the mold is made impermeable, for example, by a coating 14 of an organic or mineral material and it is cooled by a forced circulation of a fluid between the inlet 8 of the enclosure and its outlet 15. By making the outer diameter and the porous wall 6 of the mold (thus, its thickness) variable, it is possible to distribute the cooling along the length of the mold.

A variation of the mold in FIG. 6 is shown in FIG. 7 wherein the porous wall 6 comprises further horizontal holes $16_1$, $16_2$, which pass through the gas-tight outside coating 14 to the inside surface of the wall 6 or stop at a short distance from it. This variation is particularly worthwhile for very long molds because the holes provide partial evacuation of the gas, which then does not have to extend entirely to the upper or lower parts of the mold. The stability of the gas film can thus be improved.

When the entire necessary length of the mold is considerable, two or more molds 3,3' may be placed one on top of the other, as shown in FIG. 8. It will thus be noted that it is possible to evacuate gas between the molds and that different theoretical concepts can be implemented in each mold. For example, the top part of the mold 3 may be heated with an electrical resistor, as shown in FIG. 5, the bottom part of the mold 3 may be equipped with metal beads, like the mold of FIG. 4 and the mold 3' may take the shape of the mold in FIG. 3.

Generally speaking, the mold of the device according to the invention comprises at least one of the following three areas: a heated part, a "strongly" cooled part, and a "weakly" cooled part.

The goal sought is to bring the glass to a low enough temperature (viscosity $>10^{7.5}$ to $10^{15}$ P). This drop in temperature should be slow enough to prevent significant core-skin temperature gradients from developing, which tend to generate mechanical constraints.

The length of time spent in the mold will depend on the starting viscosity, diameter, and type of glass. The following table gives minimum values usable during the time the glass stays in the mold:

| Rod diameter | Time spent in the mold (s) | |
| (mm) | Minimum | Preferred minimum |
| --- | --- | --- |
| 20 | 20 | 30 |
| 30 | 50 | 85 |
| 50 | 95 | 160 |
| 80 | 170 | 290 |

These minimum values may be exceeded to a significant degree, in particular, in the case of low flow rates and/or large diameters. For example, in the case of a rod diameter of 80 mm at a flow rate of 10 kg/h, a mold axial length of at least 10 cm is recommended, which represents a time of at least 450 sec.

The mold shown in FIG. 9 comprises a thermal conditioning means installed at the outlet of the mold. These means (17, 18) serve to homogenize the temperature of the glass to reduce its internal stresses and make it easy to cut. They may comprise a fixed part 17 and, possibly, a part 18 that retracts to make it possible to cut the glass in accordance with arrow 19. In the case of low flow rates, these means (17, 18) may serve to anneal the glass. Otherwise, the cut rods are fed into a classic annealing installation. Rollers $20_1$ play, in these means 17, 18, the role of the rollers $4_1$, $4_2$, of the device in FIG. 1.

The device according to the invention is suitable for shaping into rods, possibly of large diameters, types of glass with a very broad range of viscosities, from around 1–30,000 P, and preferably from 10–10,000 P.

The lowest viscosities will be preferably used for types of glass that easily devitrify. The invention, therefore, makes it possible to make rods of optical quality and with a "fire polished" surface from types of glass that devitrify at viscosities of 1–10 P.

The highest viscosities will be used in the transfer of a composition profile obtained at the outlet of a glass feed system, such as a casting tube, which may actually require high viscosity (1,000–30,000 P). In this regard, reference may be made to the aforementioned concurrently filed patent application. Thus, high viscosity will be used for shaping a "hard" glass bar, i.e., of difficult-to-melt glass (for example, borosilicate or glass ceramic). With such types of glass, obtaining low viscosities may require a feeding system that operates at a high temperature (for example, >1,500° C.), which is technologically difficult to realize. The invention, therefore, makes it possible to manufacture such types of glass under advantageous conditions.

The tables below give nonlimiting examples of operating points:

a) for homogeneous glass:

| Tube diameter (mm) | 25 | 15 | 15 | 22 | 22 | 40 |
|---|---|---|---|---|---|---|
| Viscosity (P) | 3000 | 190 | 90 | 300 | 190 | 500 |
| Rod diameter (mm) | 80 | 50 | 30 or 50 | 50 | 50 | 45 and 100 |
| Flow rate (kg/h) | 10 | 40 | 90 | 120 | 190 | 500 | b) for glass with a variable composition profile:

| Tube diameter (mm) | 16 | 10 |
|---|---|---|
| Viscosity (P) | 1200 | 1200 |
| Rod diameter (mm) | 20,100 | 10,1,00 |
| Flow rate (kg/h) | 12 | 2 |

Of course, the invention is not limited to the embodiments described and shown, which are only given by way of example. Therefore, the invention is not limited to the manufacture of cylindrical rods. Other shapes, including square, rectangular, triangular, prismatic, etc., sections may be produced, provided they do not present a sharp angle (radius of curvature>1 mm).

In the case of sections of slender shapes, a glass-feeding system, such as a "carp's tail," distributing a glass fiber rather than an axisymmetrical flow, is preferable.

The preferred orientation of the device is vertical. A slanted orientation (up to approximately 45°) may, however, be considered, in particular, to reduce the vertical space necessary for the device.

Likewise, the invention is not limited to the shaping of a rod of glass or a glassy material and extends to other materials that are solid at ambient temperatures and fluid or plastic at predetermined temperatures, which are higher than the ambient temperature, such as organic plastic materials or ceramics. Furthermore, porous materials other than those mentioned above could be used to constitute the internal wall of the mold to the extent that they are chosen from those capable of resisting the temperatures to which they will be subjected.

It is to be understood that the invention is not limited to the above examples which are chosen for illustrative purposes only. Accordingly, various changes and modifications which do not constitute departures from the spirit and scope of the invention will be apparent to persons skilled in the art, which changes and modifications are embraced by the present invention.

I claim:

1. A device for shaping molten glassy material into rods, the device comprising:
   (a) a mold having a vertical axis and a fixed cross-section, the mold comprising
      i) a cylindrical internal wall of a porous material, and
      ii) means connected to said wall for injecting a gas into said wall to cause said gas to come out of the wall on the side facing the glassy material accumulated in the mold, so as to constitute an interstitial flow of a film of gas that separates the glassy material from the inside wall of the mold;
   (b) a casting tube centered above the vertical axis of the mold, for feeding said molten glassy material into said mold; and
   (c) a free fall zone separating the casting tube from the mold.

2. A device according to claim 1, characterized by the fact that the inside wall is made of a porous structure of a material selected from the group consisting of graphite, stainless steel, a nickel alloys, bronze, and ceramics.

3. A device according to claim 1 further comprising means for thermally conditioning the glassy material and the mold.

4. A device according to claim 3, characterized by the fact that said conditioning means comprises a means for cooling the mold.

5. A device according to claim 3, characterized by the fact that said conditioning means comprises a means for heating at least the top part of the mold.

6. A device according to claim 3, characterized by the fact that said conditioning means includes means for heating the molten material in the casting tube in the vicinity of its inlet into the mold.

7. A device according to claim 1 characterized by the fact that the bottom of the mold is open and by the fact that guiding rollers act on the rod of cooled material continuously exiting the bottom of the mold to adjust its outlet rate.

8. A device according to claim 1 characterized by the fact that the mold comprises a moving bottom fitted on a mechanism for moving the bottom between the top and bottom part of the mold.

9. A device according to claims 1 characterized by the fact that it comprises an enclosure of which one of the walls consists of the porous wall of the mold, and a means for injecting a gas under pressure into this enclosure.

10. A device according to claim 9, characterized by the fact that the enclosure is partially filled with a macroscopically porous material that enables a transfer of heat between the porous wall of the mold and the enclosure.

11. A device according to claim 9, characterized by the fact that the porous wall of the mold is isolated from the enclosure by a gas-tight coating, and wherein the means for injecting gas in this wall are connected to surfaces of the wall not covered by this coating and wherein a cooling fluid circulates in the enclosure.

12. A device according to claim 11, characterized by the fact that the porous wall of the mold is penetrated at least partially by leakage holes that also penetrate the gas-tight coating.

13. A device according to claim 12 characterized by the fact that it comprises several molds stacked coaxially.

14. A device according to claim 13 characterized by the fact that it comprises, downstream from the mold means for thermal post-conditioning and means for cutting the rod of glassy material exiting the mold.

15. The device of claim 1, wherein the casting tube is characterized by having a cross-section less than the cross-section of the mold.

16. A method of forming a rod from molten glassy material by:

(a) providing a glassy material in a molten state; and (b) passing said molten glassy material through a casting tube into a mold comprising i) a cylindrical internal wall of a porous material, and ii) means connected to said wall for injecting a gas into said wall to cause said gas to come out of the wall on the side facing the glassy material accumulated in the mold, so as to constitute an interstitial flow of a film of gas that separates the molten glassy material from the inside wall of the mold;

wherein said mold is characterized by having a vertical axis and a fixed cross-section, and wherein the casting tube is centered above the vertical axis of the mold, and separated from said mold by a free fall zone.

17. The method of claim 16, wherein the glassy material is separated from the internal wall by a cushion of gas.

* * * * *